B. F. CLARK.
Meat-Hook.

No. 225,345. Patented Mar. 9, 1880.

WITNESSES:
Saml. J. VanStavoren
Jos. B. Connolly

INVENTOR,
Benjamin F. Clark,
By Connolly Bros.,
ATTORNEYS.

UNITED STATES PATENT OFFICE.

BENJAMIN F. CLARK, OF PHILADELPHIA, PENNSYLVANIA.

MEAT-HOOK.

SPECIFICATION forming part of Letters Patent No. 225,345, dated March 9, 1880.

Application filed August 23, 1879.

*To all whom it may concern:*

Be it known that I, BENJAMIN F. CLARK, of Philadelphia, in the county of Philadelphia and State of Pennsylvania, have invented certain new and useful Improvements in Adjustable Meat-Hooks; and I do hereby declare the following to be a full, clear, and exact description of the invention, such as will enable others skilled in the art to which it pertains to make and use it, reference being had to the accompanying drawings, which form part of this specification, in which—

Figure 1:
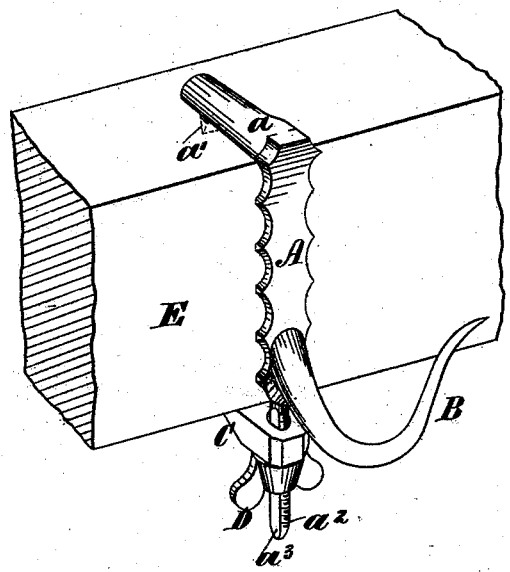
Figure 2:
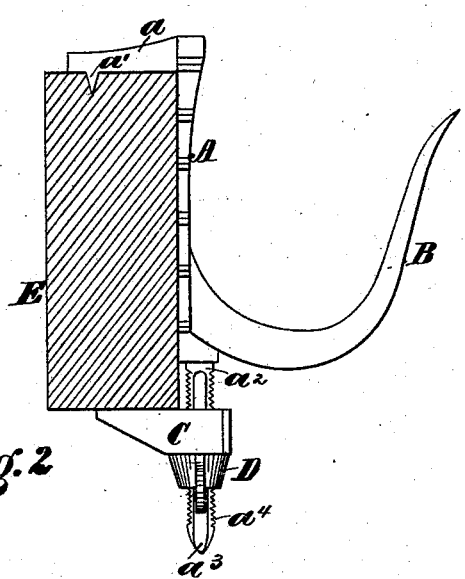

Figure 1 is a perspective of my invention, and Fig. 2 is a side elevation of the same.

My invention has for its object to provide a meat-hook which can be readily attached to and detached from the bars or rails of a stall, store, or apartment, and which may be adjusted upon a bar or rail.

My invention consists of the device hereinafter described, consisting of a base-plate from which springs or projects the hook proper, the upper end of said plate having a rearwardly-extending lug, while from the lower end depends a threaded shank provided with a sliding traveler and thumb-nut, said device being adapted to be fastened on a bar or rail by causing the latter to be clamped between the lug and traveler, as hereinafter fully set forth.

Referring to the accompanying drawings, A indicates a base-plate, from the upper end of which projects backwardly a lug, $a$, having on its under side and at or about its middle a tooth or nib, $a'$. From the lower end of said plate depends a threaded shank, $a^2$, above which is the hook B. C is a sliding traveler, which encircles the shank $a^2$, and D is a thumb-nut for moving said traveler. E shows the rail or bar to which the hook is applied.

The method of application is as follows: The plate A is placed against the bar, the lug $a$ projecting backwardly over the top of the latter. The thumb-nut D is now turned until the traveler C is moved up against the under side of the bar, drawing down the tooth or nib $a'$ until it enters the wood of said bar. The device is then firmly clamped in position and ready for use, but may be readily removed for cleaning purposes, or adjusted along the bar on loosening the nut D.

As no hole is required to be made in the rail or bar for the attachment of the device the strength of the former is in nowise impaired by the application of the latter, which also may be adjusted from time to time as convenience may require, even when meat is hanging upon it, and without leaving holes in the bar to mar the appearance of the latter.

To prevent the turning of the traveler and to keep it always in line with the lug $a$, the shank $a^2$ should be made with flattened plain sides $a^3\ a^3$, with the convex sides $a^4\ a^4$ threaded, the opening in the traveler being oval or corresponding to the cross-section of said shank. In this way the traveler is adapted to readily slide but not to turn around on said shank.

It will be noted that the plate A is devoid of any opening or slot, and hence affords no opportunity for the lodgment of particles of meat, thereby promoting cleanliness.

As the hook requires no holes to be bored or any preparation of the bar or rail to be made for its reception, it can be readily applied by butchers generally without the employment of tools, and can in like manner be speedily removed or adjusted when necessary to be cleaned.

What I claim as my invention is—

The adjustable meat-hook herein described, consisting of plate A, having hook B, lug $a$, and shank $a^2$, integral therewith, traveler C, and thumb-nut D, substantially as shown and described.

In testimony that I claim the foregoing I have hereunto set my hand this 19th day of August, 1879.

BENJAMIN F. CLARK.

Witnesses:
WM. M. MCKNIGHT,
SAML. J. VAN STAVOREN.